(12) United States Patent
Abou Mahmoud et al.

(10) Patent No.: US 10,168,771 B2
(45) Date of Patent: Jan. 1, 2019

(54) USER EYE-GAZE BASED DERIVATION OF ACTIVITY STREAM PROCESSING AUGMENTATIONS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 532 days.

(21) Appl. No.: 14/813,817

(22) Filed: Jul. 30, 2015

(65) Prior Publication Data

US 2017/0031433 A1 Feb. 2, 2017

(51) Int. Cl.
*G06F 3/01* (2006.01)

(52) U.S. Cl.
CPC .................... *G06F 3/013* (2013.01)

(58) Field of Classification Search
USPC .... 345/156, 661, 8; 715/234, 254, 256, 738, 715/744, 849; 707/733, 734, 738
See application file for complete search history.

(56) References Cited

U.S. PATENT DOCUMENTS

| | | | |
|---|---|---|---|
| 8,156,186 B2 | 4/2012 | Singh | |
| 8,434,001 B2 | 4/2013 | Kandekar et al. | |
| 2008/0294584 A1* | 11/2008 | Herz | G06F 17/30867 706/46 |
| 2011/0173570 A1* | 7/2011 | Moromisato | G06Q 10/10 715/838 |
| 2011/0258556 A1* | 10/2011 | Kiciman | G06Q 10/10 715/751 |
| 2012/0158502 A1 | 6/2012 | Chung et al. | |
| 2013/0219003 A1 | 8/2013 | Singh | |
| 2013/0254716 A1* | 9/2013 | Mishra | G06F 3/04842 715/810 |
| 2013/0275850 A1 | 10/2013 | Cudak et al. | |

(Continued)

OTHER PUBLICATIONS

Author Unknown, Eye tracking, Wikipedia, the free encyclopedia, Jul. 20, 2015, pp. 1-8, Wikimedia Foundation, Inc., Published online at: http://en.wikipedia.org/wiki/Eye_tracking.

(Continued)

*Primary Examiner* — Doon Y Chow
*Assistant Examiner* — Wendy Nicholas
(74) *Attorney, Agent, or Firm* — Lee Law, PLLC; Christopher B. Lee

(57) ABSTRACT

A content subject matter area of interest to a user is determined, using eye-gaze analysis of a user viewing existing activity stream content, according to content at a content location viewed by the user within the existing activity stream content. User-specific activity stream content augmentations are configured that are applicable to new activity stream content viewed by the user that includes the content subject matter area of interest to the user determined from the eye-gaze analysis. Using the configured user-specific activity stream content augmentations, portions of the new activity stream content viewed by the user determined to include the content subject matter area of interest to the user are augmented.

20 Claims, 4 Drawing Sheets

(56) References Cited

U.S. PATENT DOCUMENTS

| | | | | |
|---|---|---|---|---|
| 2013/0304822 A1* | 11/2013 | Tetreault | ............ | H04N 21/2187 709/204 |
| 2015/0185993 A1* | 7/2015 | Wheatley | .............. | G06F 3/0484 715/744 |
| 2015/0331240 A1* | 11/2015 | Poulos | ................. | G02B 27/017 345/8 |
| 2016/0209919 A1* | 7/2016 | Kawana | ................... | G06F 3/013 |
| 2016/0225012 A1* | 8/2016 | Ha | ..................... | G06Q 30/0242 |
| 2017/0126825 A1* | 5/2017 | Yu | ........................... | H04L 67/22 |

OTHER PUBLICATIONS

Shamsi T. Iqbal, et al., Using Eye Gaze Patterns to Identify User Tasks, Proceedings of the 2004 Grace Hopper Celebration of Women in Computing (Chicago, IL), 2004, pp. 1-6, Published online at: http://www.interruptions.net/literature/Iqbal-GHC04.pdf.
Author Unknown, Tobii Dynavox Global: Rehab SCI—Benefits of Eyegaze—Social Networking, Website/page Tobii.com, 2012, pp. 1-5, Tobii Technology, Published online at: http://www.tobii.com/en/assistive-technology/global/hidden-pages/rehab-sci/benefits-of-eyegaze/social-interaction/.

\* cited by examiner

USER EYE-GAZE BASED DERIVATION OF ACTIVITY STREAM PROCESSING AUGMENTATIONS

BACKGROUND

The present invention relates to activity stream processing. More particularly, the present invention relates to user eye-gaze based derivation of activity stream processing augmentations.

Social network users may interact with one another using their respective communication devices within an online social network platform. The online social network platform provides access to content (e.g., postings) published by other social network users, and may additionally include other forms of content published within the online social network platform.

SUMMARY

A method includes determining, using eye-gaze analysis of a user viewing existing activity stream content, a content subject matter area of interest to the user according to content at a content location viewed by the user within the existing activity stream content; configuring user-specific activity stream content augmentations applicable to new activity stream content viewed by the user that comprises the content subject matter area of interest to the user determined from the eye-gaze analysis; and augmenting, using the configured user-specific activity stream content augmentations, portions of the new activity stream content viewed by the user determined to comprise the content subject matter area of interest to the user.

A system that performs the method and a computer program product that causes a computer to perform the method are also described.

DETAILED DESCRIPTION

Figure 1:
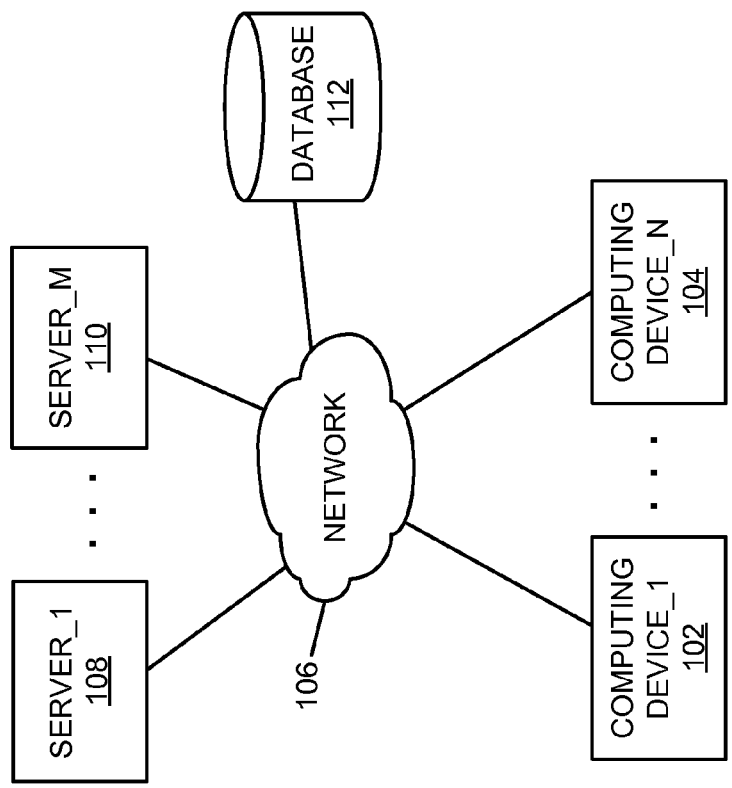
FIG. 1 is a block diagram of an example of an implementation of a system for user eye-gaze based derivation of activity stream processing augmentations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides user eye-gaze based derivation of activity stream processing augmentations. The technology described herein solves a recognized information consumption problem by providing technology that includes a new form of computational processing within complex social network computing environments. To manage increasing quantities of activity streams and social networks, and the increasing quantities of published information associated with these activity streams, the technology described herein programmatically learns/derives a user's reading interest by use of eye focus/gaze detection technology and programmatically augments processing of activity stream content to create an individualized activity stream reading experience for the respective social network users that is tailored to the user's historical activity stream reading activities (e.g., derived topics of interest, derived durations of reading particular aspects of activity streams, etc.). By use of the technology described herein, each social network user may be provided with a unique reading experience for one or more activity streams based upon their own reading tendencies and interests as learned/derived from their historical activity stream reading activities. New activity streams may be processed using the derived activity stream processing augmentations. Additional activity stream processing augmentations may be derived by further processing of the user's eye focus/gaze durations while viewing augmented activity streams.

The term "activity stream" as utilized herein represents a sequence of information/postings published by another social network user, a news feed published by a news source, and other forms sequential content postings published by individuals or entities within a social network. As such, an activity stream is considered to originate from a source that publishes information within a social network.

The technology described herein operates by determining, using eye-gaze analysis of a user viewing existing activity stream content, a content subject matter area of interest to the user according to content within the existing activity stream at a content location viewed by the user. User-specific activity stream content augmentations applicable to new activity stream content viewed by the user are configured that include the content subject matter area of interest to the user determined from the eye-gaze analysis. Portions of the new activity stream content viewed by the user determined to include the subject matter area of interest to the user are augmented using the configured user-specific activity stream content augmentations. As such, the user's attention may be programmatically focused on areas of new activity streams that are determined to be of interest to the user.

The present subject matter provides an enhanced attention management technology that displays messages to the user that are augmented with a second data set based upon eye-gaze derived interest(s). Utilizing eye tracking technologies, the type of information in which the user may show interest may be pinpointed. These interests may be recorded and used to selectively recommend or prioritize other data as it becomes available within an activity stream of one or more social networking websites.

The following are detailed processing steps that may be implemented to perform the technology described herein. As a social network user browses a social networking website, an eye tracking device monitors the user's eye movements and determines by comparison with content rendered on a display the information that the user spends time viewing. The technology collects the information the user reads in the social networking websites along with the amount of time the user spends reading the information. These items of information about what and how long the user views certain content are recorded to document where (e.g., what types of content) the user spends the most amount of time reading. Processing may then be performed to analyze the information content to determine terms that appear with higher-frequencies within the content. Based on the data collected from the eye-gaze analysis techniques, a user-specific eye-gaze derived interest model may be constructed that documents/remembers what types of information may be of interest to the user (e.g., the most frequently occurring types or categories of information). Pre-defined thresholds may be configured to create filters that may be used to display augmented information in association with future content viewing sessions within one or more social networking websites.

For example, if the user has spent more than five (5) minutes viewing information related to cloud computing technology, then a new filter may be created for the term "cloud computing." With such an eye-gaze derived interest model, the social networking websites may display filtered information using a special font or using visual cues when new data that appears within an activity stream contains the string "cloud computing". For example, the filtered data may be displayed in an increased font size, in a bold font, in a different font, in an italicized font, in a different font color, with highlighting, with reverse highlighting, with underlining, or with other content augmentations to attract the user's attention.

The filtered data may further be prioritized/emphasized relative to other content within an activity stream, and the other content that does not satisfy a configured filter may be deprioritized/de-emphasized. Prioritization/emphasis may be performed by relocating content within a webpage/document to place the filtered data higher and/or more centrally located within the webpage/document relative to the other content of the activity stream.

As such, the eye-gaze derived interest model may be constructed to remember the user's individualized interests. The eye-gaze derived interest model may be applied to new activity stream posts to improve efficiency of activity stream processing. As the respective user for which the eye-gaze derived interest model has been created reviews activity streams, the user's eye-gaze derived interest model may be updated over time to iteratively refine and further improve efficiency of filter-based processing of activity streams.

This form of augmentation of activity stream content may further assist users to review multiple activity streams more efficiently because they may be guided through the content in a manner that is specifically tailored to their personal interests. As such, the technology described herein may be considered a personalized activity stream content augmentation technology that individualizes content augmentations based upon known interests of the user derived from eye-gaze analysis of content viewed by the user, as described above and in more detail below.

The augmentation of content during subsequent viewing sessions based upon user eye-gaze based derivation of user interests may include generation of alternate text. Alternate text may include suggestions for relevant products, relevant movies, relevant books, and other forms of alternative text that may be both of interest to the user and related to what the user is contemporaneously viewing. As such, the technology described herein creates a link between what a user is interested in as derived from eye-gaze analysis and what a user is contemporaneously viewing during other browsing sessions.

Using filtering, as described above, the augmentation of content during subsequent viewing sessions based upon user eye-gaze based derivation of user interests may further include emphasizing portions of content that are known to be of interest to the user (e.g., text highlights, underlining, larger fonts, and other text augmentations). Further, portions of content that are determined to be uncorrelated with the user's known interests may be omitted from lengthy or otherwise unrelated activity streams to allow the user to focus on portions of content the user may otherwise miss where relevant information is obscured within lengthy passages of activity streams.

Using filtering, as described above, the augmentation of content during subsequent viewings session based upon user eye-gaze based derivation of user interests may further include emphasizing portions of content that are known to be of interest to the user (e.g., text highlights, underlining, larger fonts, and other text augmentations). Further, portions of content that are determined to be uncorrelated with the user's known interests may be omitted from lengthy or otherwise unrelated activity streams to allow the user to focus on portions of content the user may otherwise miss where relevant information is obscured within lengthy passages of activity streams.

It should be noted that many forms of augmentation of activity stream content are possible based upon the technology described herein. As such, any such possible forms of augmentation of activity stream content are considered to be within the scope of the present subject matter.

For example, while the description herein utilizes activity streams for purposes of example, the present subject matter is not limited to activity streams and social media posts, but may additionally be extended to include recommendation engines that provide suggestions, such as books, movies, and product recommendations, as introduced above. These recommendation engines may pinpoint/derive which terms, features, or keywords are of interest to the user through monitoring of user product searches using eye-gaze analysis, how the user reads the product details, and which related products they spend more time viewing. As such, the present technology may be utilized within a variety of platforms, as appropriate for any given implementation.

It should be noted that conception of the present subject matter resulted from recognition of certain limitations associated with activity stream processing within social networks. For example, it was observed that social networks are increasing in popularity and number. Users may use social network websites to communicate and may further obtain information about other social network users, events, and news in an increasingly pervasive manner over time by use of activity feeds. However, it was further observed that for any given user, the volume of the activity feeds received from a social network may become overwhelming, and as a result the users may be unable to identify and capture important information within the activity streams. It was determined from these observations that a new attention management system capable of determining what portion(s) of posts, articles, emails, and other content is of interest/importance to the respective user would improve processing of the increasing amount of data generated by activity feeds. It was further determined that processing that detects and analyzes a user's gaze and reading duration of different sections of content/media may improve automated analysis of the user's reading interests, and that the new attention management system may leverage information about past user reading interests derived from gaze recognition to implement activity stream processing augmentations to help focus the user on information within new activity stream content that has been determined from past gaze/post analysis to be of interest to the user. As such, a user may be guided in an efficient manner through large amounts of content associated with multiple activity streams to information that is of interest to the respective user. The present subject matter improves activity stream processing by providing activity stream processing augmentations derived from user eye-gaze based analysis, as described above and in more detail below. As such, improved activity stream processing may be obtained through use of the present technology.

The user eye-gaze based derivation of activity stream processing augmentations described herein may be performed in real time to allow prompt determinations of appropriate augmentations to activity stream processing for individual users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for user eye-gaze based derivation of activity stream processing augmentations. A computing device_1 102 through a computing device_N 104 communicate via a network 106 with several other devices. The other devices include a server_1 108 through a server_M 110, and a database 112. The database 112 may be accessed by any of the respective computing devices as appropriate for a given implementation, and may be used to store content associated with activity streams published by one or more different entities within one or more social networks.

As will be described in more detail below in association with FIG. 2 through FIG. 4, the computing device_1 102 through the computing device_N 104 and the server_1 108 through the server_M 110 may each provide automated user eye-gaze based derivation of activity stream processing augmentations. The automated user eye-gaze based derivation of activity stream processing augmentations is based upon derivation of user interests in accordance with eye-tracking and content analysis in conjunction with amounts of time invested by users in reading/viewing content associated with activity streams. It should be noted that the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a social networking server, a web server, an application server, or other data server device.

The database 112 may include a relational database, an object database, or any other storage type of device. As such, the database 112 may be implemented as appropriate for a given implementation.

Figure 2:
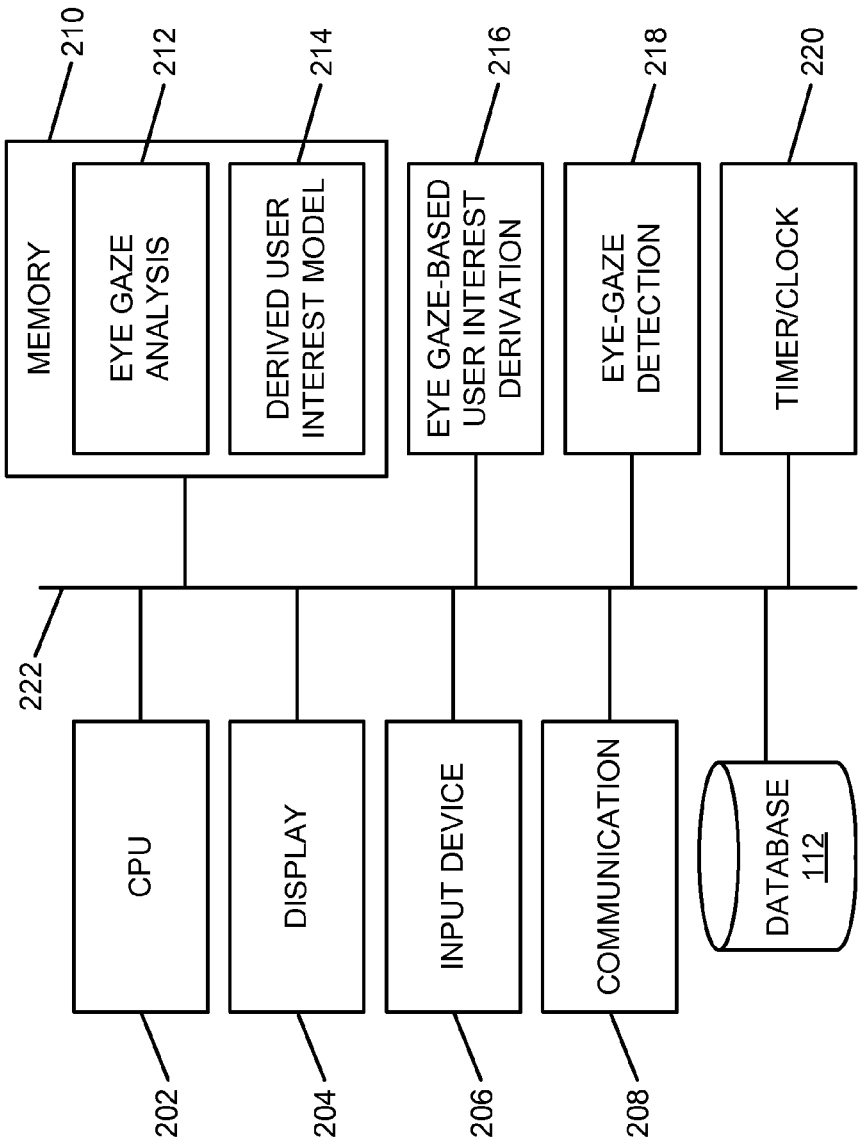
FIG. 2 is a block diagram of an example of an implementation of a core processing module capable of performing user eye-gaze based derivation of activity stream processing augmentations according to an embodiment of the present subject matter.

FIG. 2 is a block diagram of an example of an implementation of a core processing module 200 capable of performing user eye-gaze based derivation of activity stream processing augmentations. The core processing module 200 may be associated with the computing device_1 102 through the computing device_N 104 to identify user-specific content augmentation filters based upon user eye-gaze detection while a user is viewing an activity stream, and to apply those filters to new activity stream content as new posts are published to activity streams. Additionally and/or alternatively, the core processing module 200 may be associated with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of eye-gaze based derived activity stream processing augmentations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, a touchscreen, a voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an eye-gaze analysis area 212 that stores eye-gaze processing information within the core processing module 200. The memory 210 also includes a derived user interest model area 214 that provides configuration and storage space for user-specific eye-gaze derived interest models.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An eye-gaze based user interest derivation module 216 is also illustrated. The eye-gaze based user interest derivation module 216 provides analytical processing capabilities associated with user eye-gaze analysis for the core processing module 200, as described above and in more detail below. The eye-gaze based user interest derivation module 216 implements the automated user eye-gaze based derivation of activity stream processing augmentations of the core processing module 200.

It should also be noted that the eye-gaze based user interest derivation module 216 may form a portion of other circuitry described without departure from the scope of the present subject matter. The eye-gaze based user interest derivation module 216 may form a portion of an interrupt service routine (ISR), a portion of an operating system, or a portion of an application without departure from the scope of the present subject matter. The eye-gaze based user interest derivation module 216 may also include an embedded device with circuitry designed specifically to perform the processing described herein as appropriate for a given implementation.

An eye-gaze detection module 218 is illustrated and used to detect user eye movement relative to a surface of a display, such as the display 204. The eye-gaze detection module 218 may utilize any technology appropriate for detection of eye movements and gaze, such as use of a camera (not separately illustrated) to perform retina image recognition and image-based motion detection of a user's retina, and/or other technology as appropriate for a given implementation. The eye-gaze based user interest derivation module 216 may utilize information derived from the eye-gaze detection module 218 for the information processing activities described herein to determine user content interests based upon eye-gaze locations.

A timer/clock module 220 is illustrated and used to determine timing and date information, such as durations of a user's gaze at locations of rendered activity stream content on a display such as the display 204, as described above and in more detail below. As such, the eye-gaze based user interest derivation module 216 may utilize information derived from the timer/clock module 220 for information processing activities, such as the user eye-gaze based derivation of activity stream processing augmentations described herein.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the eye-gaze based user interest derivation module 216, the eye-gaze detection module 218, the timer/clock module 220, and the database 112 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
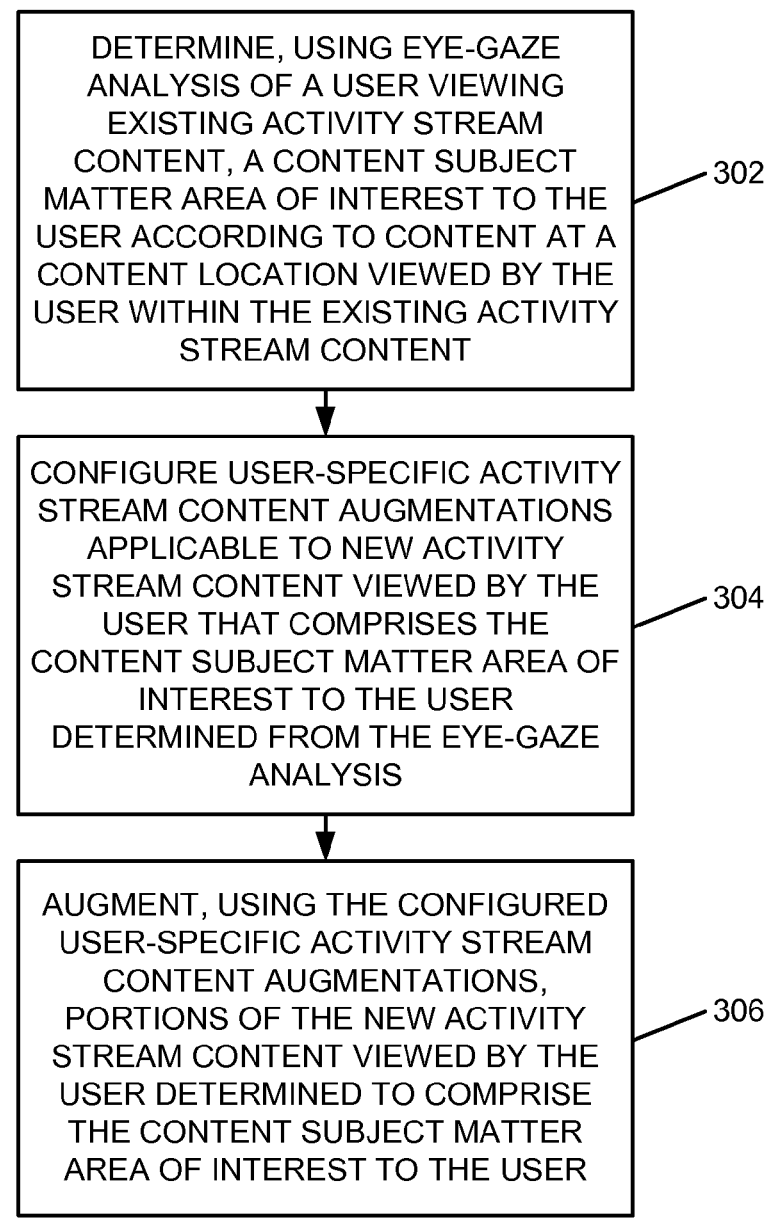
FIG. 3 is a flow chart of an example of an implementation of a process for user eye-gaze based derivation of activity stream processing augmentations according to an embodiment of the present subject matter.
Figure 4:
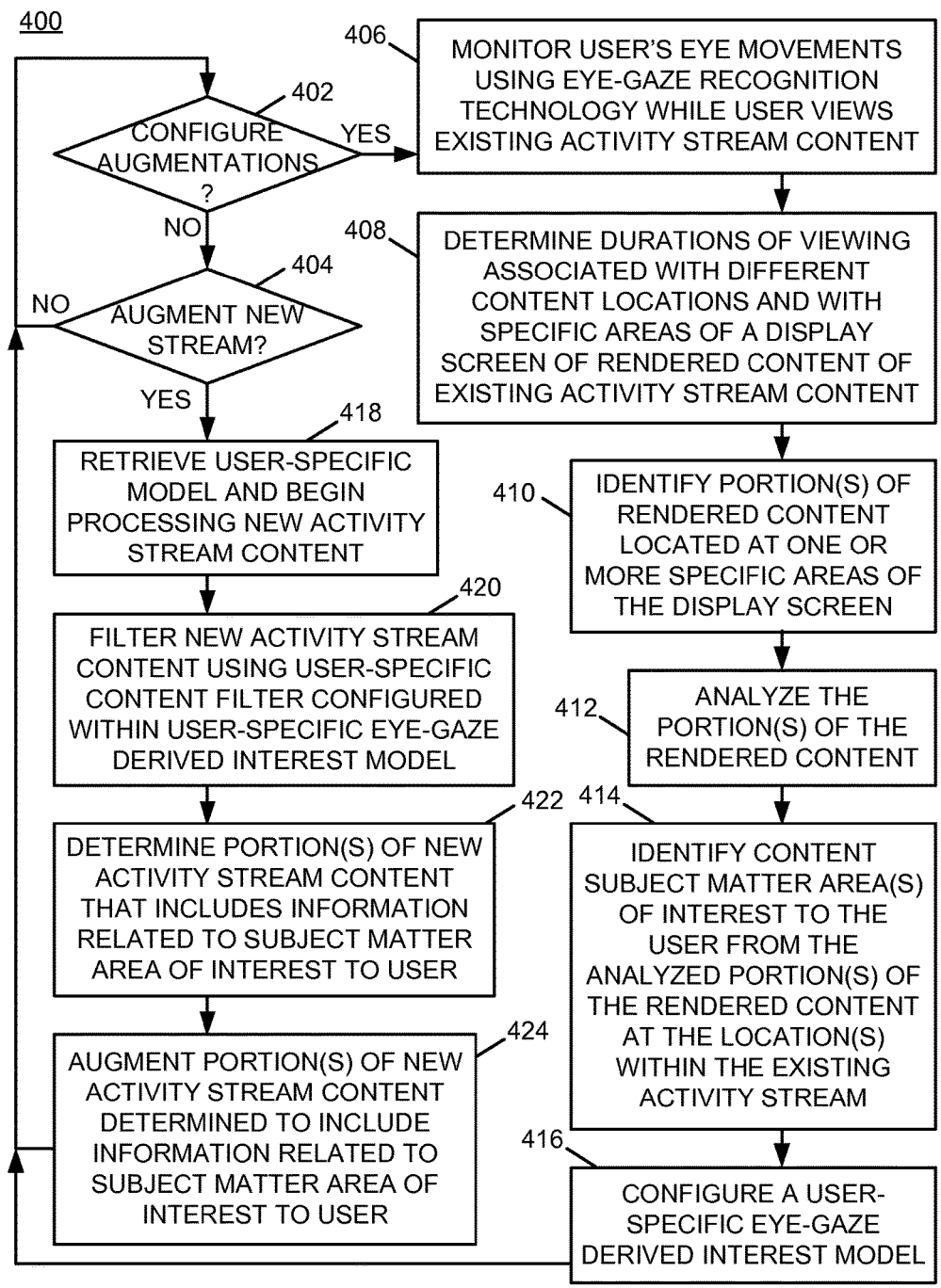
FIG. 4 is a flow chart of an example of an implementation of a process for user eye-gaze based derivation of activity stream processing augmentations that creates and applies a user-specific eye-gaze derived interest model according to an embodiment of the present subject matter.

FIG. 3 through FIG. 4 described below represent example processes that may be executed by devices, such as the core processing module 200, to perform the automated user eye-gaze based derivation of activity stream processing augmentations associated with the present subject matter. Many other variations on the example processes are possible and all are considered within the scope of the present subject matter. The example processes may be performed by modules, such as the eye-gaze based user interest derivation module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for user eye-gaze based derivation of activity stream processing augmentations. The process 300 represents a computer-implemented method of performing the subject matter described herein. At block 302, the process 300 determines, using eye-gaze analysis of a user viewing existing activity stream content, a content subject matter area of interest to the user according to content at a content location viewed by the user within the existing activity stream content. At block 304, the process 300 configures user-specific activity stream content augmentations applicable to new activity stream content viewed by the user that comprises the content subject matter area of interest to the user determined from the eye-gaze analysis. At block 306, the process 300 augments, using the configured user-specific activity stream content augmentations, portions of the new activity stream content viewed by the user determined to comprise the content subject matter area of interest to the user.

FIG. 4 is a flow chart of an example of an implementation of a process 400 for user eye-gaze based derivation of activity stream processing augmentations that creates and applies a user-specific eye-gaze derived interest model. The process 400 represents a computer-implemented method of performing the subject matter described herein. At decision point 402, the process 400 begins higher-level iterative processing and determines whether to configure user-specific activity stream content augmentations and a user-specific eye-gaze derived interest model. For example, the process 400 may detect a user request to configure user-specific activity stream content augmentations and a user-specific eye-gaze derived interest model. Alternatively, the determination may be performed responsive to a user browsing activity stream content that does not already have configured user-specific activity stream content augmentations and a user-specific eye-gaze derived interest model. Affirmative processing at decision point 402 will be deferred and described in more detail below.

As such, in response to determining not to configure user-specific activity stream content augmentations and a user-specific eye-gaze derived interest model, the process 400 makes a determination at decision point 404 as to whether to augment an activity stream according to configured user-specific activity stream content augmentations and a user-specific eye-gaze derived interest model. Affirmative processing at decision point 404 will be deferred and described in more detail below. In response to determining not to augment an activity stream according to configured user-specific activity stream content augmentations and a user-specific eye-gaze derived interest model, the process 400 returns to decision point 402 and iterates as described above to complete the higher-level iterative processing.

Returning to the description of decision point 402, in response to determining to configure user-specific activity stream content augmentations and a user-specific eye-gaze derived interest model, the process 400 monitors the user's eye movement using eye-gaze recognition technology while the user views existing activity stream content at block 406. At block 408, the process 400 determines, according to eye-gaze analysis of the user, durations of viewing associated with different content locations and with one or more specific areas of a display screen of rendered content within the existing activity stream content. At block 410, the process 400 identifies one or more portions of the rendered content located at one or more specific areas of the display screen. At block 412, the process 400 analyzes the portion(s) of the rendered content. The analysis may include text analysis, image analysis, or other forms of analysis as appropriate for the particular form of activity stream content. At block 414, the process 400 identifies one or more content subject matter areas of interest to the user from the analyzed portion(s) of the rendered content according to content at the location(s) within the existing activity stream content viewed by the user for a longest duration of time. For example, the process 400 may identify time spent reviewing portions of the existing activity stream and frequencies of different terms, and other processing as appropriate for a given implementation.

At block 416, the process 400 configures a user-specific eye-gaze derived interest model. The user-specific eye-gaze derived interest model may be configured within a memory, such as the memory 210, and may include one or more user-specific content filters configured with high-frequency word-count terms identified to be of interest to the user. The configured user-specific eye-gaze derived interest model may include the content subject matter area of interest to the user determined from the eye-gaze analysis. The user-specific eye-gaze derived interest model may further include configured content appearance changes that differentiate content that matches the content subject matter area of interest to the user from surrounding content within the new activity stream content and that attract the user's attention to the content that matches the subject matter area of interest to the user while viewing the new activity stream content. The configured content appearance changes may include increased font size, a bolded font, a different font, an italicized font, a different font color, a highlighting, a reverse highlighting, and an underlining, and other content appearance changes as appropriate for a given implementation. The process 400 returns to decision point 402 and iterates as described above.

Returning to the description of decision point 404, in response to determining to augment an activity stream according to configured user-specific activity stream content augmentations and a user-specific eye-gaze derived interest model, the process 400 retrieves a configured user-specific eye-gaze derived interest model associated with the specific user that is viewing new activity stream content, and begins processing the new activity stream content at block 418. At block 420, the process 400 filters the new activity stream content using a user-specific content filter configured within the user-specific eye-gaze derived interest model. At block 422, the process 400 determines one or more portion(s) of the new activity stream content that include information related to the subject matter area of interest to the user. At block 424, the process 400 augments the one or more portions of the new activity stream content determined to include the information related to the subject matter area of interest to the user. The augmentation of the portions of the new activity stream content may include augmenting the filtered activity stream content with content accents that attract the user's attention to the augmented filtered activity stream content. The accents may include applying at least one text augmentation to portions of the new activity stream content that match the subject matter area of interest to the user selected from a group of text augmentations of increased font size, a bolded font, a different font, an italicized font, a different font color, a highlighting, a reverse highlighting, and an underlining. The augmentation of the portions of the new activity stream content may further include prioritizing a display location of one or more of the portions of the new activity stream content determined to include the information related to the subject matter area of interest to the user to relative to display locations of other portions of the new activity stream content. It should be understood that the filtering, analysis, and augmentation of new activity stream content may continue throughout a user's browsing session, and the process 400 is considered to perform this additional iterative processing, though this iterative processing is understood from the description above and is not additionally depicted to avoid crowding within the drawing figure. When the user's browsing session concludes, the process 400 returns to decision point 402 and iterates as described above.

As such, the process 400 operates to configure a user-specific eye-gaze derived interest model based upon activity stream content interests of a user derived based upon eye-gaze analysis of the user's viewing of existing activity stream content. The process 400 further operates to process new activity streams according to the configured user-specific eye-gaze derived interest model.

As described above in association with FIG. 1 through FIG. 4, the example systems and processes provide user eye-gaze based derivation of activity stream processing augmentations. Many other variations and additional activities associated with user eye-gaze based derivation of activity stream processing augmentations are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   determining from text and image content, using iteratively at least one of text analysis or image analysis in combination with eye-gaze analysis of a user viewing existing activity stream content of an activity stream of social network postings published by a social networking website, a content subject matter area of interest to the user according to frequencies of occurrence of different words identified within the text and image content according to one or more of the text analysis and the image analysis at different content locations viewed by the user within the existing activity stream content of the activity stream of social network postings;
   configuring user-specific activity stream content augmentations applicable to new activity stream content viewed by the user that comprises the content subject matter area of interest to the user determined according to the frequencies of occurrence of the different words and images from the iterative use of the at least one of the text analysis or the image analysis in combination with the eye-gaze analysis; and
   augmenting, within the activity stream of social network postings using the configured user-specific activity stream content augmentations, portions of the new activity stream content determined to comprise the content subject matter area of interest to the user;
   where augmenting the portions of the new activity stream content comprises changing an appearance of the portions of the new activity stream content to attract attention of the user to the augmented portions within the new activity stream content.

2. The computer-implemented method of claim 1, where determining from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings comprises:
   iteratively monitoring the user's eye movements using eye-gaze recognition technology while the user views the existing activity stream content of the activity stream of social network postings;
   determining, using the monitored eye movements, durations of viewing of individual portions of the social network postings by the user associated with the different content locations within the existing activity stream content of the activity stream of social network postings; and
   identifying the content subject matter area of interest to the user according to the one or more of the text analysis and the image analysis of the text and image content at the different content locations within the existing activity stream content of the activity stream of social network postings viewed by the user for a longest duration of time.

3. The computer-implemented method of claim 1, where determining from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings comprises:
   determining, using the eye-gaze analysis, a duration of a gaze of the user at a specific area of a display screen of rendered content;
   identifying a portion of the rendered content of a social network posting located at the specific area of the display screen;
   analyzing at least one of the text and image content of the portion of the rendered content of the social network posting; and
   identifying the content subject matter area of interest to the user from the analyzed portion of the rendered content.

4. The computer-implemented method of claim 1, where configuring the user-specific activity stream content augmentations applicable to the new activity stream content viewed by the user that comprises the content subject matter area of interest to the user determined according to the frequencies of occurrence of the different words and images from the iterative use of the at least one of the text analysis or the image analysis in combination with the eye-gaze analysis comprises:

configuring a user-specific eye-gaze derived interest model that comprises:

one or more user-specific content filters configured with high-frequency word-count terms identified to be of interest to the user from the eye-gaze analysis of the frequencies of occurrence of the different words identified within the text and image content;

the content subject matter area of interest to the user determined from the iterative use of the at least one of the text analysis or the image analysis in combination with the eye-gaze analysis; and configured content appearance changes that (i) differentiate content that matches the content subject matter area of interest to the user, (ii) distinguish the matching content from surrounding content within the new activity stream content, and (iii) attract the attention of the user to the content that matches the content subject matter area of interest to the user while viewing the new activity stream content.

5. The computer-implemented method of claim 1, where changing the appearance of the portions of the new activity stream content to attract the attention of the user to the augmented portions within the new activity stream content comprises:

filtering the portions of the new activity stream content using a user-specific content filter configured within a user-specific eye-gaze derived interest model; and augmenting the filtered portions of the new activity stream content with content accents that attract the attention of the user to the augmented filtered portions of the new activity stream content.

6. The computer-implemented method of claim 1, where augmenting, within the activity stream of social network postings using the configured user-specific activity stream content augmentations, the portions of the new activity stream content determined to comprise the content subject matter area of interest to the user further comprises:

determining that at least one portion of the new activity stream content comprises information related to the content subject matter area of interest to the user; and prioritizing a display location of the at least one portion of the new activity stream content determined to comprise the information related to the content subject matter area of interest to the user relative to display locations of other portions of the new activity stream content.

7. The computer-implemented method of claim 1, where: changing the appearance of the portions of the new activity stream content to attract the attention of the user to the augmented portions within the new activity stream content comprises applying at least one text augmentation to the portions of the new activity stream content that match the content subject matter area of interest to the user selected from a group consisting of an increased font size, a bolded font, a different font, an italicized font, a different font color, a highlighting, a reverse highlighting, and an underlining; and where augmenting the portions of the new activity stream content determined to comprise the content subject matter area of interest to the user further comprises generating and adding alternate text suggestions for products, movies, or books related to the content subject matter area of interest to the user within the new activity stream content of the activity stream of social network postings.

8. A system, comprising:

a memory; and a processor programmed to:

determine from text and image content, using iteratively at least one of text analysis or image analysis in combination with eye-gaze analysis of a user viewing existing activity stream content of an activity stream of social network postings published by a social networking website, a content subject matter area of interest to the user according to frequencies of occurrence of different words identified within the text and image content according to one or more of the text analysis and the image analysis at different content locations viewed by the user within the existing activity stream content of the activity stream of social network postings;

configure, within the memory, user-specific activity stream content augmentations applicable to new activity stream content viewed by the user that comprises the content subject matter area of interest to the user determined according to the frequencies of occurrence of the different words and images from the iterative use of the at least one of the text analysis or the image analysis in combination with the eye-gaze analysis; and augment, within the activity stream of social network postings using the configured user-specific activity stream content augmentations, portions of the new activity stream content determined to comprise the content subject matter area of interest to the user;

where, in being programmed to augment the portions of the new activity stream content, the processor is programmed to change an appearance of the portions of the new activity stream content to attract attention of the user to the augmented portions within the new activity stream content.

9. The system of claim 8, where, in being programmed to determine from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings, the processor is programmed to:

iteratively monitor the user's eye movements using eye-gaze recognition technology while the user views the existing activity stream content of the activity stream of social network postings;

determine, using the monitored eye movements, durations of viewing of individual portions of the social network postings by the user associated with the different content locations within the existing activity stream content of the activity stream of social network postings; and identify the content subject matter area of interest to the user according to the one or more of the text analysis and the image analysis of the text and image content at the different content locations within the existing activity stream content of the activity stream of social network postings viewed by the user for a longest duration of time.

10. The system of claim 8, where, in being programmed to determine from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings, the processor is programmed to:
  determine, using the eye-gaze analysis, a duration of a gaze of the user at a specific area of a display screen of rendered content;
  identify a portion of the rendered content of a social network posting located at the specific area of the display screen;
  analyze at least one of the text and image content of the portion of the rendered content of the social network posting; and
  identify the content subject matter area of interest to the user from the analyzed portion of the rendered content.

11. The system of claim 8, where, in being programmed to configure, within the memory, the user-specific activity stream content augmentations applicable to the new activity stream content viewed by the user that comprises the content subject matter area of interest to the user determined according to the frequencies of occurrence of the different words and images from the iterative use of the at least one of the text analysis or the image analysis in combination with the eye-gaze analysis, the processor is programmed to:
  configure, within the memory, a user-specific eye-gaze derived interest model that comprises:
    one or more user-specific content filters configured with high-frequency word-count terms identified to be of interest to the user from the eye-gaze analysis of the frequencies of occurrence of the different words identified within the text and image content;
    the content subject matter area of interest to the user determined from the iterative use of the at least one of the text analysis or the image analysis in combination with the eye-gaze analysis; and
    configured content appearance changes that (i) differentiate content that matches the content subject matter area of interest to the user, (ii) distinguish the matching content from surrounding content within the new activity stream content, and (iii) attract the attention of the user to the content that matches the content subject matter area of interest to the user while viewing the new activity stream content.

12. The system of claim 8, where one of:
  in being programmed to change the appearance of the portions of the new activity stream content to attract the attention of the user to the augmented portions within the new activity stream content, the processor is programmed to:
    filter the portions of the new activity stream content using a user-specific content filter configured within a user-specific eye-gaze derived interest model and augment the filtered portions of the new activity stream content with content accents that attract the attention of the user to the augmented filtered portions of the new activity stream content; and
  in being programmed to augment, within the activity stream of social network postings using the configured user-specific activity stream content augmentations, the portions of the new activity stream content determined to comprise the content subject matter area of interest to the user, the processor is further programmed to:
    determine that at least one portion of the new activity stream content comprises information related to the content subject matter area of interest to the user and prioritize a display location of the at least one portion of the new activity stream content determined to comprise the information related to the content subject matter area of interest to the user relative to display locations of other portions of the new activity stream content.

13. The system of claim 8, where:
  in being programmed to change the appearance of the portions of the new activity stream content to attract the attention of the user to the augmented portions within the new activity stream content, the processor is programmed to apply at least one text augmentation to the portions of the new activity stream content that match the content subject matter area of interest to the user selected from a group consisting of an increased font size, a bolded font, a different font, an italicized font, a different font color, a highlighting, a reverse highlighting, and an underlining; and
  in being programmed to augment the portions of the new activity stream content determined to comprise the content subject matter area of interest to the user, the processor is further programmed to generate and add alternate text suggestions for products, movies, or books related to the content subject matter area of interest to the user within the new activity stream content of the activity stream of social network postings.

14. A computer program product, comprising:
  a computer readable storage medium having computer readable program code embodied therewith, where the computer readable storage medium is not a transitory signal per se and where the computer readable program code when executed on a computer causes the computer to:
    determine from text and image content, using iteratively at least one of text analysis or image analysis in combination with eye-gaze analysis of a user viewing existing activity stream content of an activity stream of social network postings published by a social networking website, a content subject matter area of interest to the user according to frequencies of occurrence of different words identified within the text and image content according to one or more of the text analysis and the image analysis at different content locations viewed by the user within the existing activity stream content of the activity stream of social network postings;
    configure user-specific activity stream content augmentations applicable to new activity stream content viewed by the user that comprises the content subject matter area of interest to the user determined according to the frequencies of occurrence of the different words and images from the iterative use of the at least one of the text analysis or the image analysis in combination with the eye-gaze analysis; and
augment, within the activity stream of social network postings using the configured user-specific activity stream content augmentations, portions of the new activity stream content determined to comprise the content subject matter area of interest to the user;
where, in causing the computer to augment the portions of the new activity stream content, the computer readable program code when executed on the computer causes the computer to change an appearance of the portions of the new activity stream content to attract attention of the user to the augmented portions within the new activity stream content.

15. The computer program product of claim 14, where, in causing the computer to determine from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings, the computer readable program code when executed on the computer causes the computer to:
    iteratively monitor the user's eye movements using eye-gaze recognition technology while the user views the existing activity stream content of the activity stream of social network postings;
    determine, using the monitored eye movements, durations of viewing of individual portions of the social network postings by the user associated with the different content locations within the existing activity stream content of the activity stream of social network postings; and
    identify the content subject matter area of interest to the user according to the one or more of the text analysis and the image analysis of the text and image content at the different content locations within the existing activity stream content of the activity stream of social network postings viewed by the user for a longest duration of time.

16. The computer program product of claim 14, where, in causing the computer to determine from the text and image content, using iteratively the at least one of the text analysis or the image analysis in combination with the eye-gaze analysis of the user viewing the existing activity stream content of the activity stream of social network postings published by the social networking website, the content subject matter area of interest to the user according to the frequencies of occurrence of the different words identified within the text and image content according to the one or more of the text analysis and the image analysis at the different content locations viewed by the user within the existing activity stream content of the activity stream of social network postings, the computer readable program code when executed on the computer causes the computer to:
    determine, using the eye-gaze analysis, a duration of a gaze of the user at a specific area of a display screen of rendered content;
    identify a portion of the rendered content of a social network posting located at the specific area of the display screen;
    analyze at least one of the text and image content of the portion of the rendered content of the social network posting; and
    identify the content subject matter area of interest to the user from the analyzed portion of the rendered content.

17. The computer program product of claim 14, where, in causing the computer to configure the user-specific activity stream content augmentations applicable to the new activity stream content viewed by the user that comprises the content subject matter area of interest to the user determined according to the frequencies of occurrence of the different words and images from the iterative use of the at least one of the text analysis or the image analysis in combination with the eye-gaze analysis, the computer readable program code when executed on the computer causes the computer to:
    configure a user-specific eye-gaze derived interest model that comprises:
        one or more user-specific content filters configured with high-frequency word-count terms identified to be of interest to the user from the eye-gaze analysis of the frequencies of occurrence of the different words identified within the text and image content;
        the content subject matter area of interest to the user determined from the iterative use of the at least one of the text analysis or the image analysis in combination with the eye-gaze analysis; and
        configured content appearance changes that (i) differentiate content that matches the content subject matter area of interest to the user, (ii) distinguish the matching content from surrounding content within the new activity stream content, and (iii) attract the attention of the user to the content that matches the content subject matter area of interest to the user while viewing the new activity stream content.

18. The computer program product of claim 14, where, in causing the computer to change the appearance of the portions of the new activity stream content to attract the attention of the user to the augmented portions within the new activity stream content, the computer readable program code when executed on the computer causes the computer to:
    filter the portions of the new activity stream content using a user-specific content filter configured within a user-specific eye-gaze derived interest model; and
    augment the filtered portions of the new activity stream content with content accents that attract the attention of the user to the augmented filtered portions of the new activity stream content.

19. The computer program product of claim 14, where, in causing the computer to augment, within the activity stream of social network postings using the configured user-specific activity stream content augmentations, the portions of the new activity stream content determined to comprise the content subject matter area of interest to the user, the computer readable program code when executed on the computer further causes the computer to:
    determine that at least one portion of the new activity stream content comprises information related to the content subject matter area of interest to the user; and
    prioritize a display location of the at least one portion of the new activity stream content determined to comprise the information related to the content subject matter area of interest to the user relative to display locations of other portions of the new activity stream content.

20. The computer program product of claim 14, where:
- in causing the computer to change the appearance of the portions of the new activity stream content to attract the attention of the user to the augmented portions within the new activity stream content, the computer readable program code when executed on the computer causes the computer to apply at least one text augmentation to the portions of the new activity stream content that match the content subject matter area of interest to the user selected from a group consisting of an increased font size, a bolded font, a different font, an italicized font, a different font color, a highlighting, a reverse highlighting, and an underlining; and
- in causing the computer to augment the portions of the new activity stream content determined to comprise the content subject matter area of interest to the user, the computer readable program code when executed on the computer further causes the computer to generate and add alternate text suggestions for products, movies, or books related to the content subject matter area of interest to the user within the new activity stream content of the activity stream of social network postings.

\* \* \* \* \*